US012767609B2

(12) United States Patent
Han

(10) Patent No.: US 12,767,609 B2
(45) Date of Patent: Oct. 20, 2026

(54) METHOD OF MANUFACTURING TITANIUM OXIDE-BASED SUPPORT FOR FUEL CELL USING ULTRASONIC SPRAY PYROLYSIS

(71) Applicants: Hyundai Motor Company, Seoul (KR); Kia Corporation, Seoul (KR)

(72) Inventor: Sang Jin Han, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 555 days.

(21) Appl. No.: 18/354,023

(22) Filed: Jul. 18, 2023

(65) Prior Publication Data

US 2024/0182371 A1 Jun. 6, 2024

(30) Foreign Application Priority Data

Dec. 1, 2022 (KR) ........................ 10-2022-0165462

(51) Int. Cl.
*C04B 38/00* (2006.01)
*C04B 35/46* (2006.01)
*H01M 4/88* (2006.01)

(52) U.S. Cl.
CPC .......... *C04B 38/0045* (2013.01); *C04B 35/46* (2013.01); *C04B 38/0054* (2013.01); *C04B 38/009* (2013.01); *H01M 4/8803* (2013.01); *C04B 2235/48* (2013.01)

(58) Field of Classification Search
CPC ...... C01G 23/047; C01G 23/07; C04B 35/46; H01M 4/8803
See application file for complete search history.

(56) References Cited

U.S. PATENT DOCUMENTS

| | | | | |
|---|---|---|---|---|
| 10,529,460 | B2 * | 1/2020 | Kim | B01J 35/77 |
| 2021/0163304 | A1 | 6/2021 | Schmidt et al. | |

FOREIGN PATENT DOCUMENTS

| | | | | |
|---|---|---|---|---|
| CN | 102812587 A | * 12/2012 | C07C 5/333 |
| CN | 109244485 A | * 1/2019 | H01M 8/1011 |
| KR | 20070043291 A | * 4/2007 | B01J 35/45 |
| KR | 20180051263 A | * 5/2018 | C01F 7/02 |
| KR | 20180093352 A | 8/2018 | |
| KR | 20200096525 A | 8/2020 | |
| WO | WO-0206159 A1 | * 1/2002 | B01J 23/42 |

OTHER PUBLICATIONS

Chang et al. Controlled synthesis of porous particles via aerosol processing and their applications. Advanced Powder Technology 25 (2014) 32-42.*

(Continued)

*Primary Examiner* — Noah S Wiese
(74) *Attorney, Agent, or Firm* — Slater Matsil, LLP

(57) ABSTRACT

An embodiment method of manufacturing a titanium oxide-based support for a fuel cell includes preparing a sol-gel solution by mixing a titanium precursor and an ammonium-based pore control agent, preparing an ultrasonic spray solution by mixing the sol-gel solution and a transition metal precursor, allowing the ultrasonic spray solution to react by ultrasonic spray pyrolysis, and obtaining a final product by calcining a result obtained after completion of reaction.

20 Claims, 3 Drawing Sheets

(56) References Cited

OTHER PUBLICATIONS

Kim et al. Characterization of mesoporous alumina particles prepared by spray pyrolysis of Al(NO3)2•9H2O precursor: Effect of CTAB and urea. Microporous and Mesoporous Materials 128 (2010) 85-90.*

Chang, H. et al., "Synthetic routes for titania nanoparticles in the flame spray pyrolysis," Colloids and Surfaces A: Physicochem. Eng. Aspects 313-314 (2008) 282-287, Jun. 2, 2007, 6 pages.

Yildirim, S., "Synthesis, characterization and optical properties of Ag-doped TiO2 nanoparticles by flame spray pyrolysis," J. Mater Sci.: Mater Electron, https://doi.org/10.1007/s10854-021-06187-9, May 12, 2021, 13 pages.

* cited by examiner

METHOD OF MANUFACTURING TITANIUM OXIDE-BASED SUPPORT FOR FUEL CELL USING ULTRASONIC SPRAY PYROLYSIS

CROSS-REFERENCE TO RELATED APPLICATIONS

This application claims the benefit of Korean Patent Application No. 10-2022-0165462, filed on Dec. 1, 2022, which application is hereby incorporated herein by reference.

TECHNICAL FIELD

The present disclosure relates to a method of manufacturing a titanium oxide-based support for a fuel cell by applying an ultrasonic spray pyrolysis process to a sol-gel (modified sol-gel) process.

BACKGROUND

A support for a fuel cell needs to have a pore structure and a specific surface area with an appropriate size in order to support metal nanoparticles used as a catalyst and also needs to have sufficient conductivity for efficient movement of electrons.

In general, a carbon support is applied to fuel cells, but the demand for an oxide-based support having enhanced durability is emerging due to problems caused by corrosion of the carbon support.

However, typical oxide-based supports have disadvantages in that application thereof is difficult due to very low specific surface area and conductivity.

Moreover, for the oxide-based supports, additives are used to improve the specific surface area and pore structure, and technology for synthesizing fine oxide particles using a sol-gel process is being developed, but limitations are imposed on controlling mass productivity through continuous synthesis reaction and the shape of the manufactured fine particles.

Against this background, it is required to develop technology for a continuous synthesis process of an oxide-based support capable of controlling the shape of fine particles while solving the problems with pore structure and lack of conductivity.

SUMMARY

An embodiment of the present invention provides a method of manufacturing a titanium oxide-based support for a fuel cell, which is capable of solving problems with pore structure and lack of conductivity by applying, in a sol-gel process, cetyltrimethylammonium bromide (CTAB) as a pore control agent and a transition metal precursor as an additive, and of ensuring mass productivity of particles through continuous reaction using ultrasonic spray pyrolysis and also controlling the manufactured particles to have a spherical shape.

The embodiments of the present invention are not limited to the foregoing. The embodiments of the present invention will be able to be clearly understood through the following description and to be realized by the means described in the claims and combinations thereof.

Embodiments of the present invention provide a method of manufacturing a titanium oxide-based support for a fuel cell including preparing a sol-gel solution by mixing a titanium precursor and an ammonium-based pore control agent, preparing an ultrasonic spray solution by mixing the sol-gel solution and a transition metal precursor, allowing the ultrasonic spray solution to react by ultrasonic spray pyrolysis, and obtaining a final product by calcining the result obtained after completion of reaction.

Here, preparing the sol-gel solution may include preparing a first mixed solution by mixing a first solvent including acetic acid and the titanium precursor, preparing a second mixed solution by mixing a second solvent including distilled water and isopropanol and the ammonium-based pore control agent, and preparing the sol-gel solution by mixing the first mixed solution and the second mixed solution.

The titanium precursor may include titanium(IV) isopropoxide (TIIP).

The ammonium-based pore control agent may be cetyltrimethylammonium bromide (CTAB).

The titanium concentration of the sol-gel solution may be 0.1 to 0.5 M.

The molar ratio of titanium to ammonium-based pore control agent in the sol-gel solution may be 1:0.05-0.3.

The mass ratio of transition metal relative to titanium in the ultrasonic spray solution may be 0.05 or less.

The transition metal precursor may include at least one selected from the group consisting of nickel, copper, and combinations thereof.

In the method, allowing the ultrasonic spray solution to react may be performed using an ultrasonic generation system with 3 to 10 vibrators.

In the method, allowing the ultrasonic spray solution to react may be performed at an ultrasonic vibration intensity of 1 to 2 MHz.

In the method, allowing the ultrasonic spray solution to react may include transporting spray droplets formed by ultrasonic generation to a reactor using an inert gas.

In the method, allowing the ultrasonic spray solution to react may be performed by allowing the spray droplets to react at a temperature of 300° C. to 1000° C. for a residence time of 2 to 3 seconds in the reactor.

In the method, obtaining the final product may be performed through calcination at a temperature of 400 to 900° C. for 1 to 24 hours.

The final product may have a diameter of 0.01 to 2 μm.

The final product may include a plurality of pores, the diameter of the pores being 4 to 8 nm.

BRIEF DESCRIPTION OF THE DRAWINGS

The above and other features of embodiments of the present invention will now be described in detail with reference to certain exemplary embodiments thereof illustrated in the accompanying drawings, which are given hereinbelow by way of illustration only, and thus are not limitative of the present invention, and wherein.

DETAILED DESCRIPTION OF ILLUSTRATIVE EMBODIMENTS

Figure 1:
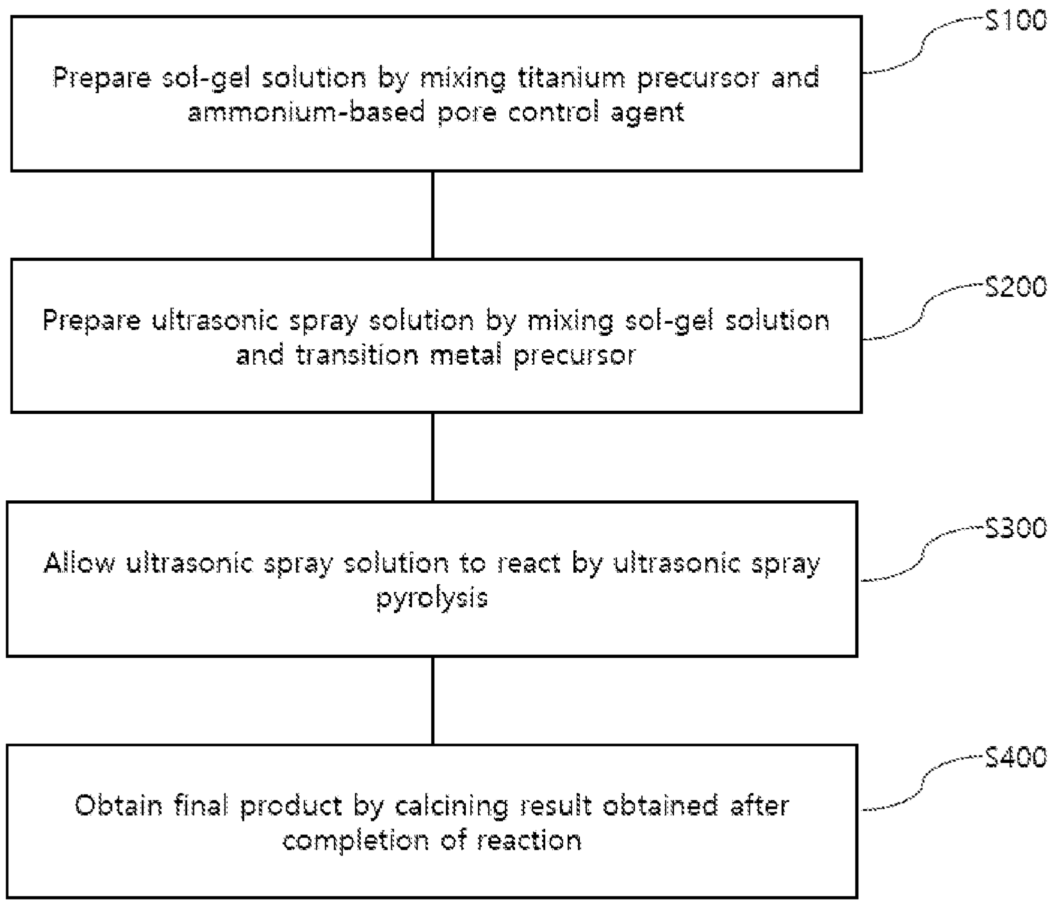
FIG. 1 is a flowchart showing a process of manufacturing a titanium oxide-based support for a fuel cell according to embodiments of the present invention.

The above and other objects, features, and advantages of embodiments of the present invention will be more clearly understood from the following preferred embodiments taken in conjunction with the accompanying drawings. However, the present invention is not limited to the embodiments disclosed herein and may be modified into different forms. These embodiments are provided to thoroughly explain the disclosure and to sufficiently transfer the spirit of the present invention to those skilled in the art.

Throughout the drawings, the same reference numerals will refer to the same or like elements. For the sake of clarity of embodiments of the present invention, the dimensions of structures are depicted as being larger than the actual sizes thereof. It will be understood that, although terms such as "first," "second," etc. may be used herein to describe various elements, these elements are not to be limited by these terms. These terms are only used to distinguish one element from another element. For instance, a "first" element discussed below could be termed a "second" element without departing from the scope of the present invention. Similarly, the "second" element could also be termed a "first" element. As used herein, the singular forms are intended to include the plural forms as well, unless the context clearly indicates otherwise.

It will be further understood that the terms "comprise," "include," "have," etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it may be directly on the other element, or intervening elements may be present therebetween. Similarly, when an element such as a layer, film, area, or sheet is referred to as being "under" another element, it may be directly under the other element or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous and includes all values from the minimum value of said range to the maximum value thereof, unless otherwise indicated. Moreover, when such a range pertains to integer values, all integers including the minimum value to the maximum value are included, unless otherwise indicated.

Embodiments of the present invention pertain to a method of manufacturing a titanium oxide-based support for a fuel cell using an ultrasonic spray pyrolysis process. Hereinafter, a detailed description will be given of embodiments of the present invention with reference to the accompanying drawings.

FIG. 1 is a flowchart showing a process of manufacturing a titanium oxide-based support for a fuel cell according to embodiments of the present invention. With reference to FIG. 1, the method of manufacturing a titanium oxide-based support for a fuel cell according to embodiments of the present invention includes preparing a sol-gel solution by mixing a titanium precursor and an ammonium-based pore control agent (S100), preparing an ultrasonic spray solution by mixing the sol-gel solution and a transition metal precursor (S200), allowing the ultrasonic spray solution to react by ultrasonic spray pyrolysis (S300), and obtaining a final product by calcining the result after completion of reaction (S400).

Individual steps of the method of manufacturing the titanium oxide-based support for a fuel cell according to embodiments of the present invention are specified below.

Before describing embodiments of the present invention, the mixing process in embodiments of the present invention may be performed using at least one selected from among stirring, high-pressure dispersion, and ultrasonic dispersion, and a mixed solution may be prepared through a typical mixing process.

First, in S100, a sol-gel solution may be prepared by mixing a titanium precursor and an ammonium-based pore control agent.

Specifically, in S100, preparing the sol-gel solution may include preparing a first mixed solution by mixing a first solvent including acetic acid and the titanium precursor, preparing a second mixed solution by mixing a second solvent including distilled water and isopropanol and the ammonium-based pore control agent, and preparing the sol-gel solution by mixing the first mixed solution and the second mixed solution.

In S100, the titanium concentration of the sol-gel solution may be 0.1 to 0.5 M. Also, the molar ratio of titanium to ammonium-based pore control agent in the sol-gel solution may be 1:0.05-0.3.

In preparing the first mixed solution, the first solvent and the titanium precursor may be mixed. Here, the titanium precursor may include titanium(IV) isopropoxide (TIIP).

Also, the first solvent serves to produce a reaction intermediate by reacting with the titanium precursor, and acetic acid having a purity of 99% or more may be used.

Specifically, in preparing the first mixed solution, the first solvent and the titanium precursor may be mixed in a molar ratio of 0.1:1.0. Here, in preparing the first mixed solution, the mixing process is preferably performed in a sealed space in order to prevent loss due to evaporation of the solution.

Subsequently, in preparing the second mixed solution, the second solvent and the ammonium-based pore control agent may be mixed. Here, the ammonium-based pore control agent may be cetyltrimethylammonium bromide (CTAB). The second solvent may include distilled water and isopropanol. Preferably, the second solvent includes distilled water and isopropanol that are mixed in a ratio of 1:1.

Subsequently, in preparing the sol-gel solution, the first mixed solution and the second mixed solution may be mixed.

Preferably, in preparing the second mixed solution, a round-bottom flask is placed in an oil bath, the first mixed solution is slowly added to the second mixed solution using a separatory funnel, and vigorous stirring is performed. Here, the flow rate may be adjusted such that the first mixed solution is slowly added in the form of droplets over a period of 10 minutes or more. Subsequently, after mixing of the first mixed solution and the second mixed solution, stirring may be performed for 5 to 8 hours at 750 rpm using a magnetic bar at a temperature of 85 to 95° C. in the oil bath. Subsequently, during stirring, a 1 M nitric acid solution may be used to induce formation of a titanium oxide sol through peptization. After addition of the nitric acid solution, a reflux device is introduced and reaction is carried out for 24 hours. After completion of reaction, distilled water may be added to obtain the sol-gel solution having a sol concentration of 0.1 to 0.5 M.

Next, in S200, an ultrasonic spray solution is prepared by mixing the transition metal precursor and the sol-gel solution. Here, the transition metal precursor may include at least one selected from the group consisting of nickel, copper, and combinations thereof.

In S200, the mass ratio of the transition metal relative to titanium in the ultrasonic spray solution may be 0.05 or less. Here, a small amount of distilled water may be added to the transition metal precursor.

Next, in S300, the ultrasonic spray solution may be subjected to an ultrasonic spray pyrolysis process. The ultrasonic spray pyrolysis process enables the formation of the spherical titanium oxide support into fine particles. Here, S300 may be performed using an ultrasonic generation system.

Figure 2:
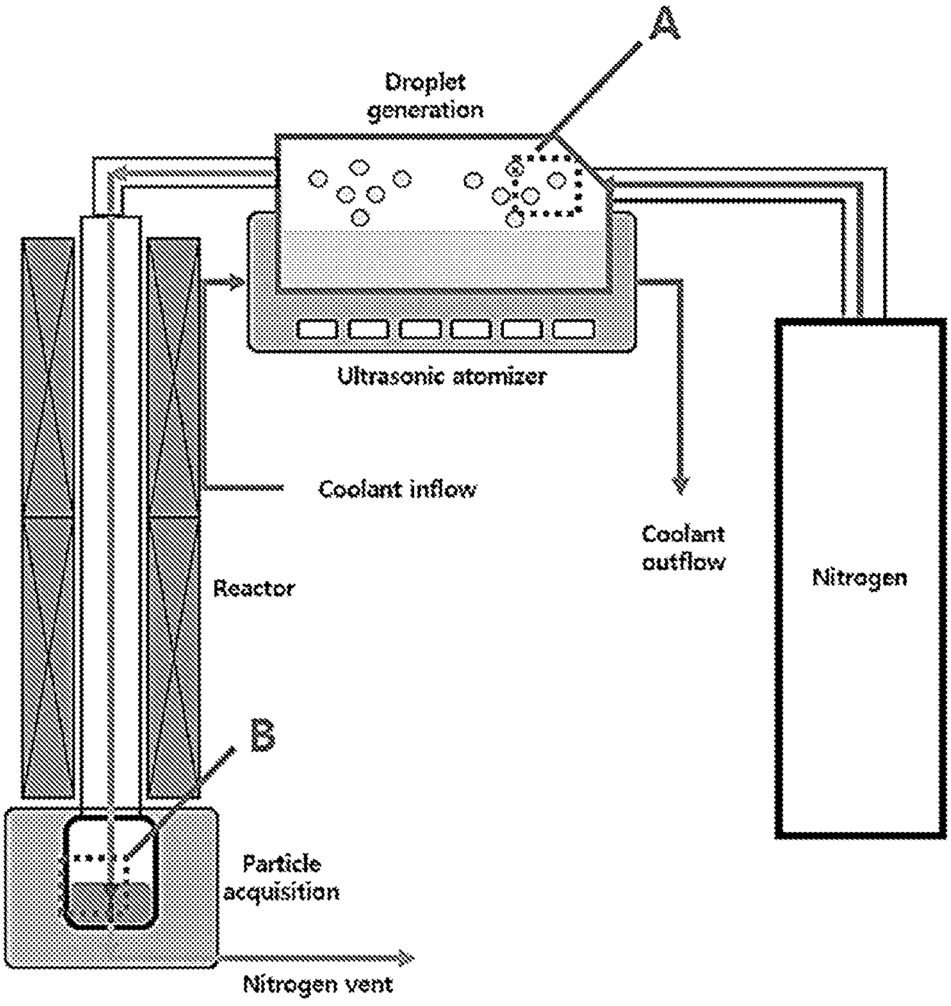
FIG. 2 schematically shows an ultrasonic system used for ultrasonic spray pyrolysis.

FIG. 2 schematically shows an ultrasonic system used for the ultrasonic spray pyrolysis process.

With reference to FIG. 2, the ultrasonic generation system includes 3 to 10 vibrators and is able to generate ultrasonic waves by vibrating the vibrators.

As shown in A of FIG. 2, when ultrasonic waves are generated in the ultrasonic spray solution, spray droplets are generated through an ultrasonic atomizer. The spray droplets thus generated are transported to a high-temperature reactor by a carrier gas.

Therefore, as shown in B of FIG. 2, final particles may be obtained by allowing the spray droplets to react for a predetermined residence time in the reactor.

The size of the ultrasonic generation system may vary depending on the scale of the process.

In the ultrasonic generation system used in embodiments of the present invention, the container for the spray solution is made of an acrylic material, and the portion in contact with the vibrator is sealed with a polyimide-based film so that spraying may proceed through vibration.

As the carrier gas, a stable inert gas such as nitrogen gas (99.9%) or argon gas may be used. The flow rate of the carrier gas may depend on the reaction temperature in the reactor. The reactor may be exemplified by a heat-treated quartz tube, and the reaction temperature may be set by enclosing the quartz tube within a cylindrical furnace. The temperature of the portion in which the particles are obtained may be about 170° C., and a filter for obtaining the particles may include, for example, a thimble filter or the like. The quartz tube may have an inner diameter of about 30 mm, an outer diameter of about 34 mm, and a length of about 1200 mm.

In S300, the ultrasonic spray solution may be placed in an ultrasonic spray container, followed by ultrasonic spray pyrolysis.

Specifically, S300 may include generating spray droplets through an ultrasonic atomizer, transporting the droplets to a reactor using an inert gas as a carrier gas, synthesizing spherical oxide support particles through pyrolysis of the droplets injected into the reactor, and obtaining the oxide support particles.

In generating the droplets, vibration may be generated at an intensity of 1 to 2 MHz in the ultrasonic spray solution to form fine and evenly sized spray droplets through an ultrasonic atomizer. Preferably, the intensity of vibration is set to 1.7 MHz.

Here, if the vibration intensity is less than 1 MHz, the size of the generated particles may increase with a decrease in the vibration intensity, but when the vibration intensity decreases excessively, it may be difficult to generate droplets through ultrasonic spraying. On the other hand, if the vibration intensity exceeds 2 MHz, the size of the generated particles may decrease with an increase in the vibration intensity, but when the vibration intensity excessively increases, the generated droplets may not pass through the reactor by the carrier gas depending on the size and weight thereof.

Figure 3:
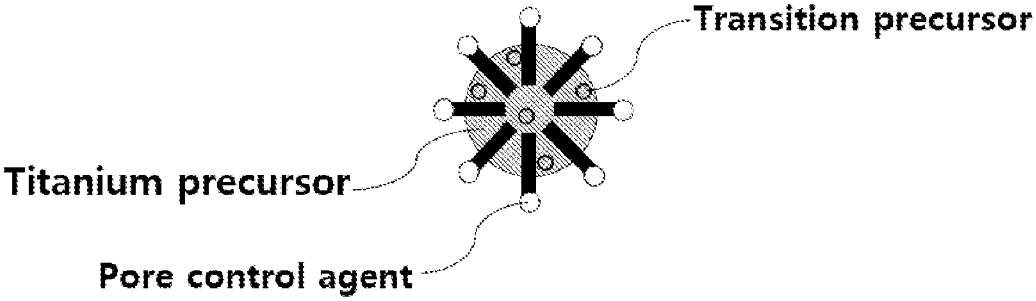
FIG. 3 shows a spray droplet formed by ultrasonic generation in part A of FIG. 2.

FIG. 3 shows a spray droplet formed by ultrasonic generation in part A of FIG. 2. With reference to FIG. 3, uniform fine particles including the titanium precursor, the pore control agent, and the transition metal precursor are provided in the form of spray droplets before pyrolysis through ultrasonic treatment.

Subsequently, in transporting the droplets to the reactor, the droplets may be transported to the reactor using an inert gas such as nitrogen as the carrier gas. Here, in embodiments of the present invention, a sufficient space may be maintained between the sprayed droplets by the introduced carrier gas, making it possible to control the shape and size of the particles.

Subsequently, in synthesizing the oxide support particles, the droplets are synthesized into spherical oxide support particles through solvent evaporation, oxidation, and pyrolysis while rapidly passing through the high-temperature reactor. Here, reaction may be carried out under conditions in that the residence time of the droplets in the reactor is 2 to 3 seconds and the temperature of the reactor is 300° C. to 1000° C. If the residence time in the reactor exceeds 3 seconds, the residence time becomes longer than necessary, and thus rapid reaction at a relatively high temperature continues, such that contraction of the generated particles may occur, which affects the pore structure, making it impossible to form oxide support particles having a size within a predetermined range and having a spherical shape according to embodiments of the present invention. Also, if the temperature of the reactor is less than 300° C., evaporation of the solvent constituting the droplets and reaction of the pore control component may not be sufficiently performed. On the other hand, if the temperature of the reactor exceeds 1000° C., the quartz tube for the reactor may melt.

Finally, in obtaining the oxide support particles, mass production of particles is possible due to a continuous reaction process by obtaining the synthesized result.

Therefore, embodiments of the present invention have an advantage of mass production of particles through continuous addition and supplementation of the reaction solution by virtue of continuous particle formation reaction.

Finally, in S40*o*, a desired product may be obtained by calcining the result after completion of reaction. The calcination process is performed to ensure crystallinity of the particles and to remove impurities.

In S400, calcination may be performed at a temperature of 400 to 900° C. for 1 to 24 hours. Preferably, the calcination process is performed at a temperature of 400 to 900° C. for about 2 hours at a heating rate of 2° C./min.

Specifically, in S400, the particles obtained after completion of reaction may be placed in a box-type furnace and a calcination process may be performed.

Figure 4:
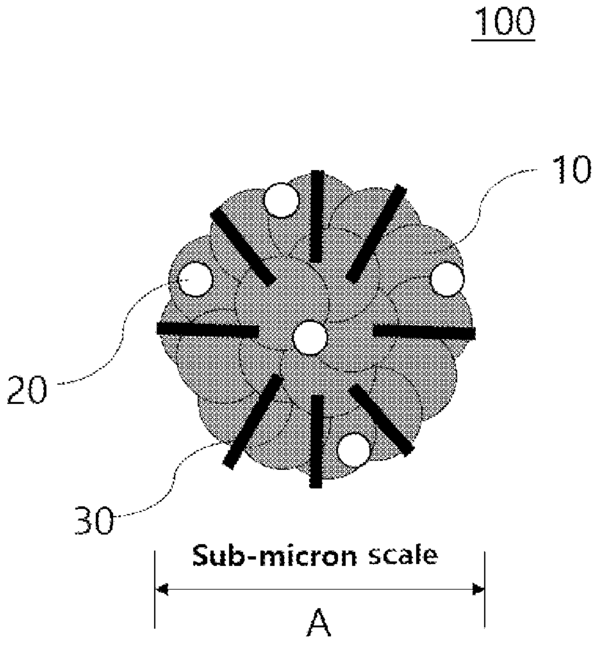
FIG. 4 schematically shows a titanium oxide-based support synthesized through the manufacturing process of embodiments of the present invention.

FIG. 4 schematically shows the titanium oxide-based support obtained through the manufacturing process of embodiments of the present invention.

With reference to FIG. 4, the titanium oxide-based support 100, which is the final product, has a diameter A of 0.01 to 1 μm, with a spherical shape. Moreover, the titanium oxide-based support 100 is provided in the form of particles uniformly synthesized from the titanium precursor 10, the ammonium-based pore control agent 20, and the transition metal precursor 30.

The titanium oxide-based support 100 may include a plurality of pores by the ammonium-based pore control agent 20, and the diameter of the pores may be 4 to 8 nm.

Also, since the transition metal precursor 30 is uniformly distributed in the titanium oxide-based support 100, electrical conductivity may be ensured.

Therefore, embodiments of the present invention are capable of synthesizing a conventional sol-gel mixed solution into spherical titanium oxide-based fine particles having a desired pore structure and conductivity through an ultrasonic spray pyrolysis process and a calcination process.

In addition, since it is not difficult to control the ultrasonic spray pyrolysis process and the calcination process in embodiments of the present invention, spherical titanium oxide-based fine particles may be conveniently manufactured.

Also, in embodiments of the present invention, the ammonium-based pore control agent is used as a template, making it possible to control the pore structure and specific surface area of oxide particles and simultaneously to ensure electrical conductivity by addition of the transition metal.

After S40*o*, embodiments of the present invention may further include preparing a catalyst powder for an electrode by mixing the titanium oxide-based support and a catalyst metal precursor, preparing an electrode slurry by mixing the catalyst powder, an ionomer, and a solvent, forming an electrode by applying the electrode slurry onto a substrate, and manufacturing an electrode membrane assembly by bonding the electrode to an electrolyte membrane.

The ionomer used herein may include at least one selected from the group consisting of polysulfone, polyether ketone, polyether, polyester, polybenzimidazole, polyimide, Nafion, and combinations thereof.

The solvent used herein may include at least one selected from the group consisting of ethanol, isopropyl alcohol (IPA), propanol, ethoxyethanol, butanol, ethylene glycol, distilled water, amyl alcohol, and combinations thereof.

Also, the substrate used herein may be a typical substrate material used in the electrode manufacturing method. Moreover, the electrode may be manufactured using a typical technique, without being limited thereto. Specifically, the electrode may be manufactured by coating a release paper with the electrode slurry using a process such as spraying, bar coating, slot die coating, or the like. Furthermore, when manufacturing an electrode membrane assembly by bonding the electrode to the electrolyte membrane, a hot pressing process may be performed.

A better understanding of embodiments of the present invention may be obtained through the following example. This example is merely set forth to illustrate embodiments of the present invention and is not to be construed as limiting the scope of the present invention.

EXAMPLE

First, acetic acid and a titanium precursor were placed in a beaker and stirred. Here, titanium(IV) isopropoxide (TIP) was used as the titanium precursor, and acetic acid with a purity of 99% or more was used. The molar ratio of acetic acid to titanium precursor (TIP) was 0.1:1.0. Accordingly, the concentration of the finally prepared titanium oxide-based sol solution was set to 0.1 to 0.5 M based on titanium (Ti).

Subsequently, 150 mL of isopropanol was added to the mixed solution and stirred, after which the beaker was sealed to prevent loss due to evaporation of the solution to afford a first mixed solution.

Subsequently, apart from the first mixed solution prepared as described above, a solvent mixture of distilled water and isopropanol and a pore control agent were mixed with stirring to afford a second mixed solution. Here, the pore control agent that was used was cetyltrimethylammonium bromide (CTAB). The CTAB/Ti molar ratio fell within the range of 0.05 to 0.2, and the ratio of distilled water to isopropanol in the second mixed solution was 1:1.

Subsequently, a round-bottom flask was placed in an oil bath, the first mixed solution was slowly added to the second mixed solution using a separatory funnel, and vigorous stirring was performed. Here, the flow rate was adjusted so that the first mixed solution could be slowly added in the form of droplets to the second mixed solution through a separatory funnel over 10 minutes or more.

After completion of mixing, the temperature of the oil bath was raised and reaction was carried out with stirring. Here, stirring was performed at 750 rpm using a magnetic bar for 6 hours at a temperature of 95° C. Subsequently, a nitric acid solution was added to the mixed solution during reaction, followed by further stirring, a reflux device was introduced, and reaction was continued for 24 hours. Here, a 1 M nitric acid solution was used to induce formation of a titanium oxide sol through peptization. After completion of reaction, distilled water was added with stirring to obtain a predetermined sol concentration (0.1 to 0.5 M). Subsequently, the round-bottom flask was cooled to room temperature, and thus a sol-gel solution was obtained.

Subsequently, an ultrasonic spray solution was prepared by adding a transition metal precursor to the sol-gel solution obtained as described above in order to improve electrical conductivity. As the transition metal precursor, either nickel or copper was selectively used. Here, the transition metal precursor was added to the sol-gel solution along with a small amount of distilled water. The ultrasonic spray solution in which the mass ratio of transition metal relative to titanium was 0.05 or less was prepared.

Subsequently, the ultrasonic spray solution was placed in a container for ultrasonic spray pyrolysis, subjected to an ultrasonic spray pyrolysis process, and then subjected to a calcination process, thus finally manufacturing titanium oxide-based support particles. Here, the ultrasonic spray pyrolysis process was performed at a vibration intensity of 1.7 MHz using an ultrasonic generation system with 6 vibrators. The spray droplets thus generated were transported to a reactor at a temperature of 400° C. to 900° C. using nitrogen gas (99.9%) and allowed to react for a residence time of about 2 to 3 seconds, thereby obtaining particles. The particles thus obtained were subjected to a calcination process to synthesize titanium oxide-based support particles. Here, the calcination process was performed at 450° C. to 900° C., the heating rate was 2° C./min, and the reaction time was 2 hours.

Meanwhile, in a conventional method of manufacturing an oxide-based support, titanium dioxide particles are manufactured through gel formation through a sol-gel process, drying, and heat treatment, and as such, the processing time required to manufacture particles is quite long and it is difficult to control the shape of the particles.

In addition, in a method of synthesizing fine powder particles by performing a conventional sol-gel process and a flame spray pyrolysis process, it is difficult to control the temperature gradient of the generated flame and the reaction time of the sprayed droplets due to direct use of flame as a reaction source.

In addition, a synthesis method for controlling the pore structure of particles by adding a Pluronic copolymer during a conventional sol-gel process is not suitable in view of mass transfer and electrode structure because the pore structure of the manufactured particles is largely formed to the level of 8 nm or more, and the shape of the particles is also non-uniform.

However, in embodiments of the present invention, an ultrasonic spray pyrolysis process and a calcination process are sequentially performed on a solution to which an ammonium-based pore control agent and a transition metal precursor are applied as additives in a sol-gel process, thereby making it possible to manufacture a titanium oxide-based support having a predetermined size and a spherical shape while ensuring electrical conductivity.

Moreover, according to embodiments of the present invention, it is easy to control the shape of the particles while ensuring mass productivity of the particles through continuous reaction by the ultrasonic spray pyrolysis process.

As is apparent from the above description, according to embodiments of the present invention, a titanium oxide-based support having a predetermined size and a spherical shape can be manufactured by sequentially performing an ultrasonic spray pyrolysis process and a calcination process on a mixed solution of a titanium precursor, an ammonium-based pore control agent, and a transition metal precursor.

In addition, according to embodiments of the present invention, a titanium oxide-based support including a plurality of pores having a diameter of 4 to 8 nm can be provided using an ammonium-based pore control agent, and can thus be applied to a catalyst for a fuel cell.

In addition, according to embodiments of the present invention, a method of synthesizing oxide particles that facilitates mass production can be provided.

The effects of embodiments of the present invention are not limited to the above-mentioned effects. It should be understood that the effects of embodiments of the present invention include all effects that can be inferred from the description of embodiments of the present invention.

Although specific embodiments of the present disclosure have been described with reference to the accompanying drawings, those skilled in the art will appreciate that the present disclosure may be embodied in other specific forms without changing the technical spirit or essential features thereof. Thus, the embodiments described above should be understood to be non-limiting and illustrative in every way.

What is claimed is:

1. A method of manufacturing a titanium oxide-based support for a fuel cell, the method comprising:

preparing a sol-gel solution by mixing a titanium precursor and an ammonium-based pore control agent;

preparing an ultrasonic spray solution by mixing the sol-gel solution and a transition metal precursor;

allowing the ultrasonic spray solution to react by ultrasonic spray pyrolysis; and obtaining a final product by calcining a result obtained after completion of reaction, wherein the ammonium-based pore control agent is for controlling a pore structure and specific surface area of oxide particles and comprises cetyltrimethylammonium bromide (CTAB).

2. The method of claim 1, wherein preparing the sol-gel solution comprises:

preparing a first mixed solution by mixing a first solvent comprising acetic acid and the titanium precursor;

preparing a second mixed solution by mixing a second solvent comprising distilled water, isopropanol, and the ammonium-based pore control agent; and preparing the sol-gel solution by mixing the first mixed solution and the second mixed solution.

3. The method of claim 1, wherein the titanium precursor comprises titanium (IV) isoprenoid (TTIP).

4. The method of claim 1, wherein a titanium concentration of the sol-gel solution is 0.1 to 0.5 M.

5. The method of claim 1, wherein a molar ratio of titanium to the ammonium-based pore control agent in the sol-gel solution is 1:0.05 to 0.3.

6. The method of claim 1, wherein a mass ratio of transition metal relative to titanium in the ultrasonic spray solution is 0.05 or less.

7. The method of claim 1, wherein the transition metal precursor comprises nickel or copper.

8. The method of claim 1, wherein allowing the ultrasonic spray solution to react is performed using an ultrasonic generation system with 3 to 10 vibrators.

9. The method of claim 1, wherein allowing the ultrasonic spray solution to react is performed at an ultrasonic vibration intensity of 1 to 2 MHz.

10. The method of claim 1, wherein allowing the ultrasonic spray solution to react comprises transporting spray droplets formed by ultrasonic generation to a reactor using an inert gas.

11. The method of claim 10, wherein allowing the ultrasonic spray solution to react is performed by allowing the spray droplets to react at a temperature of 300° C. to 1000° C. for a residence time of 2 to 3 seconds in the reactor.

12. The method of claim 1, wherein obtaining the final product is performed through calcination at a temperature of 400 to 900° C. for 1 to 24 hours.

13. The method of claim 1, wherein the final product has a mean diameter value for all particulate of 0.01 to 2 μm.

14. The method of claim 1, wherein the final product comprises a plurality of pores, and a diameter of the pores is 4 to 8 nm.

15. A titanium-oxide based support for the fuel cell manufactured according to the method of claim 1.

16. A method of manufacturing a titanium oxide-based support for a fuel cell, the method comprising:

preparing a first mixed solution by mixing a first solvent comprising acetic acid and a titanium precursor, the titanium precursor comprising titanium (IV) isopropoxide (TTIP);

preparing a second mixed solution by mixing a second solvent comprising distilled water, isopropanol, and an ammonium-based pore control agent, the ammonium-based pore control agent is for controlling a pore structure and specific surface area of oxide particles and comprising cetyltrimethylammonium bromide (CTAB);

preparing a sol-gel solution by mixing the first mixed solution and the second mixed solution;

preparing an ultrasonic spray solution by mixing the sol-gel solution and a transition metal precursor;

allowing the ultrasonic spray solution to react by ultrasonic spray pyrolysis; and obtaining a final product by calcining a result obtained after completion of reaction.

17. The method of claim 16, wherein a molar ratio of titanium to the ammonium-based pore control agent in the sol-gel solution is 1:0.05 to 0.3.

18. The method of claim 16, wherein a mass ratio of transition metal relative to titanium in the ultrasonic spray solution is 0.05 or less, and wherein the transition metal precursor comprises nickel or copper.

19. The method of claim 16, wherein allowing the ultrasonic spray solution to react is performed using an ultrasonic generation system with 3 to 10 vibrators.

20. A method of manufacturing a titanium oxide-based support for a fuel cell, the method comprising:

preparing a first mixed solution by mixing a first solvent comprising acetic acid and a titanium precursor, the titanium precursor comprising titanium (IV) isopropoxide (TTIP);

preparing a second mixed solution by mixing a second solvent comprising distilled water, isopropanol, and an ammonium-based pore control agent, the ammonium-based pore control agent is for controlling a pore structure and specific surface area of oxide particles and comprising cetyltrimethylammonium bromide (CTAB);

preparing a sol-gel solution by mixing the first mixed solution and the second mixed solution, wherein a titanium concentration of the sol-gel solution is 0.1 to 0.5 M;

preparing an ultrasonic spray solution by mixing the sol-gel solution and a transition metal precursor;

allowing the ultrasonic spray solution to react by ultrasonic spray pyrolysis; and obtaining a final product by calcining a result obtained after completion of reaction.

* * * * *